United States Patent

Kaneko et al.

[11] Patent Number: 5,245,481
[45] Date of Patent: Sep. 14, 1993

[54] OPTICAL UNIT AND METHOD OF FIXING OPTICAL ELEMENTS IN OPTICAL UNIT

[75] Inventors: Hiroshi Kaneko, Sagamihara; Yutaka Yoshida, Tokyo; Ken Omura, Tokyo; Kimiaki Furukawa, Tokyo, all of Japan

[73] Assignee: Kabushiki Kaisha Toshiba, Kawasaki, Japan

[21] Appl. No.: 882,129

[22] Filed: May 13, 1992

[30] Foreign Application Priority Data

Jun. 28, 1991 [JP] Japan .................................. 3-157976
Jan. 31, 1992 [JP] Japan .................................. 4-17028

[51] Int. Cl.⁵ .............................................. G02B 26/08
[52] U.S. Cl. ........................................ 359/896; 359/218; 346/108
[58] Field of Search ............... 359/216, 217, 218, 219, 359/896, 819, 820; 346/1.1, 160, 108

[56] References Cited

U.S. PATENT DOCUMENTS

| 4,723,833 | 2/1988 | Yamada | 359/820 |
|---|---|---|---|
| 4,778,253 | 10/1988 | Siga et al. | 359/819 |
| 4,805,993 | 2/1989 | Blumentritt et al. | 359/820 |
| 4,943,127 | 7/1990 | McRight | 359/216 |
| 5,091,793 | 2/1992 | Goto et al. | 359/819 |
| 5,124,830 | 6/1992 | Omura et al. | 359/219 |

Primary Examiner—Loha Ben
Attorney, Agent, or Firm—Foley & Lardner

[57] ABSTRACT

This invention relates to a device and a method for securing optical elements to a housing. The optical elements such as a tertiary lens, a fourth lens, a reflecting mirror, and a filter glass are received in the housing and bonded to the same by means of a visible ray hardening type bonding agent. A maximum bonding strength can be obtained by setting the bonding agent to have a thickness of 10–100 μm and a hardness of 80 or less on the A-scale based on the Shore hardness test. Further, much time is not required for hardening the bonding agent.

18 Claims, 8 Drawing Sheets

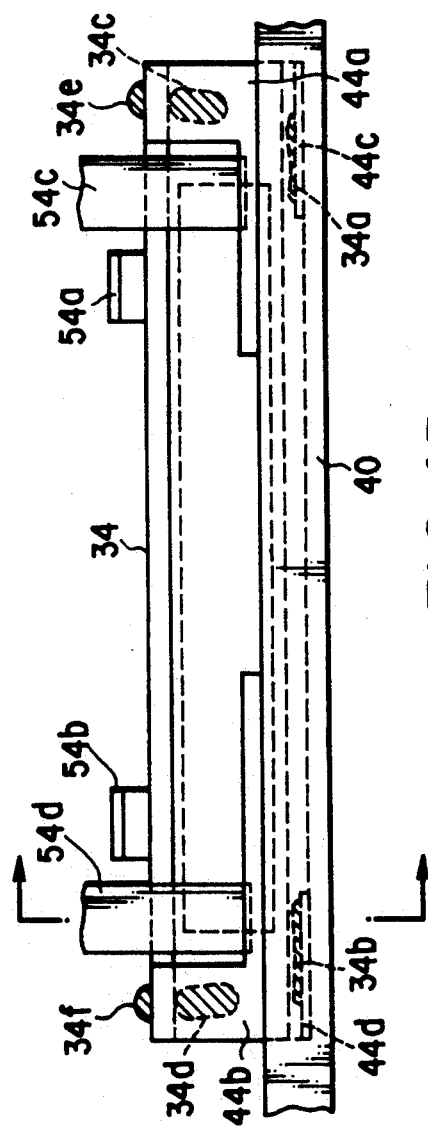
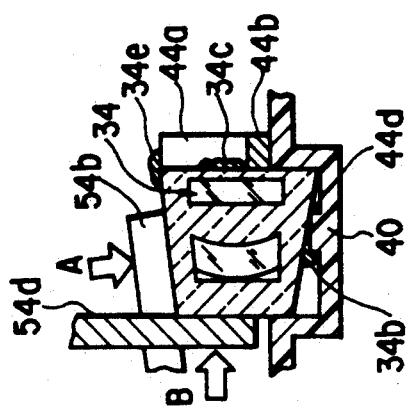
FIG. 4B
FIG. 4A

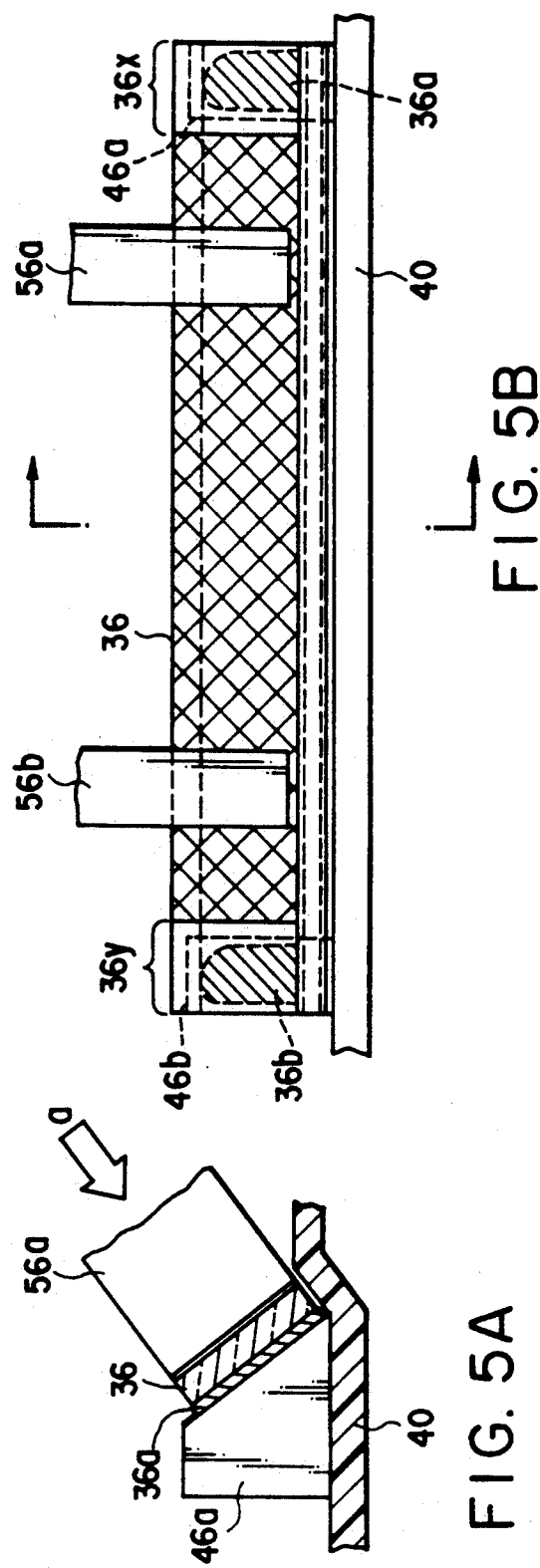

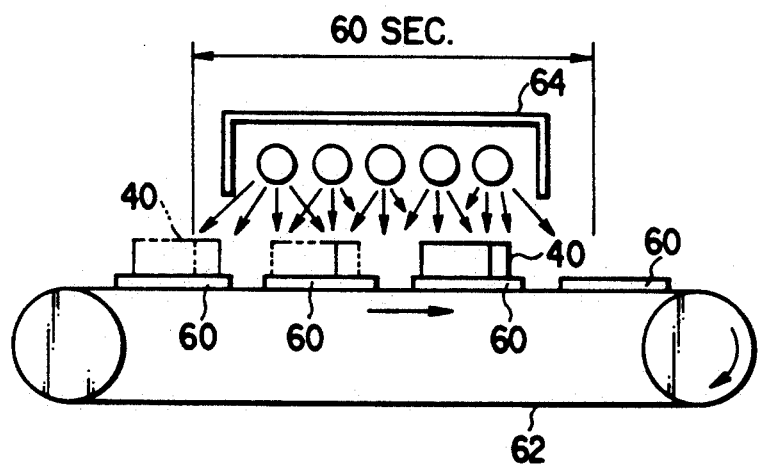
F I G. 6

OPTICAL UNIT AND METHOD OF FIXING OPTICAL ELEMENTS IN OPTICAL UNIT

BACKGROUND OF THE INVENTION

1. Field of the Invention

This invention relates to an image forming apparatus, and more particularly to an optical unit for use in a laser beam printer apparatus, and to a method of fixing optical elements in the optical unit.

2. Description of the Related Art

In general, a raster scanning type optical unit for use in a laser beam printer apparatus includes an optical deflecting system for deflecting a light beam, emitted from a light source, toward an image bearing member such as a photoconductor, and a focal system having optical elements for converging the light beam on the photoconductor. The optical deflecting system and focal system are generally housed in a housing.

The optical deflecting system includes, for example, a before-deflection optical system having lenses for transforming the light beam to have a predetermined spot size.

The focal system includes an after-deflection optical system having optical elements such as an fθ lens for correcting the distortion and field curve of the light beam deflected by the optical deflector, thereby forming a light beam having a predetermined level.

In the optical unit, the light beam emitted from the light source is transformed by the before-deflection optical system to have a predetermined spot size, is then deflected by the optical deflector toward the after-deflection optical system at a constant angular speed, and is converged by the after-deflection optical system onto the photoconductor.

In general, the fθ lens of the after-deflection optical system and any of the optical elements, are secured to the housing by means of different types of mechanical-holding members or by various bonding agents.

The housing for the optical unit is accurately molded out of a thermohardening type resin or a thermoplastic type resin with high accuracy In the housing, nuts or screw members having screw holes formed therein are inserted before molding or press fitted after the molding, for screwing the leaf-springs to secure the optical elements.

In this case, a lot of working steps are required for securing the optical elements to the housing, inevitably making the working process complex. Further, a lot of components including the leaf-springs are required for securing the fθ lens and the like to the housing, which increases the manufacturing cost.

To avoid this, a method has been proposed in which the leaf-springs are secured by self-tapping screws in place of the above-described nuts or screw members having screw holes formed therein However, this method is disadvantageous, since cuttings will be caused from the housing itself when the screws are fastened, and the cuttings may interrupt passing of the light beam. This may deteriorate the quality of an image formed on the photoconductor. Thus, the proposed method is not suitable for assembling the optical unit.

On the other hand, in the case of securing the optical elements by means of an epoxy or cyano-acrylate bonding agent, not only a lot of time is required until the agent is hardened, but also a sufficient bonding strength cannot be obtained.

Moreover, in the case of using a thermohardening type bonding agent, heat applied for hardening the agent may deform the housing In this case, if the fθ lens is made of PMMA (polymethyl methacrylate) resin, the heat may deform the lenses, as well as the housing. This method is disadvantageous, particularly since it is not suitable to apply the method to a lens made of resin and hence capable of having a complex shape.

In addition, a method using an ultraviolet (UV) hardening type bonding agent for securing the fθ lens to the housing has been proposed However, this method cannot provide a sufficient bonding strength, either. Further, it is known that ozone or heat may be generated at the time of hardening of the agent. Lenses made of PMMA or the like are not permeable to ultraviolet rays, so that a longer period of time is required for hardening the agent, and a sufficient bonding strength cannot be obtained What is worse still, positions where bonding agents can be dropped will be limited to those areas where sufficient amount of UV rays are incident.

SUMMARY OF THE INVENTION

It is an object of the invention to provide an optical unit having a housing and optical elements received in the housing and reliably secured to the same.

It is another object of the invention to provide a securing method of obtaining a sufficient bonding strength at the time of securing optical elements to a housing.

It is a further object of the invention to provide a method of securing optical elements to a housing in a short time.

It is another object of the invention to provide a securing method which is free from occurrence of ozone or a poisonous product at the time of securing optical elements to a housing.

To attain the above objects, an optical unit comprises means for deflecting a light beam, means, having a plurality of optical elements, for focusing the deflected light beam onto an object, means for housing the deflecting means and focusing means, and means for bonding each of the optical elements and the housing means, the bonding means being hardened when it receives visible spectrum having passed through the optical elements therein.

According to another aspect of the invention, an optical unit comprises means for focusing a light beam which includes a focusing lens having predetermined refracting powers and a reflecting mirror having non-reflecting areas for passing visible spectrum therethrouth, the focusing lens converges the light beam onto an object in a predetermined position, and the reflecting mirror reflects the light beam having passed the focusing lens, means, made of a thermohardening type or thermoplastic resin, for housing the focusing means, and means for bonding dropped between the housing means and each of the focusing lens and the reflecting mirror, having a thickness of 10–100 μm, the bonding means being hardened, when it receives visible spectrum having a wavelength of 450–500 nm , such that it has a hardness of 80 or less on the A-scale based on the Shore hardness test.

According to a further aspect of the invention, there is provided a method of bonding a housing of an optical unit and optical elements contained in the housing, comprising the steps of forming positioning portions to accord with the shapes of the optical elements, the positioning portions positioning the optical elements such that they stand perpendicular to a path of a light beam emitted from a light source, applying bonding means between the positioning portions and the optical elements, the bonding means being hardened when visible spectrum are radiated thereon, thereby obtaining a hardness falling within a range of 80 or less on the A-scale based on the Shore hardness test, applying an urging force to the optical elements positioned by the positioning portions, so as to control the bonding means to have a thickness of 10–100 μm, and radiating visible spectrum having a wavelength of 450–500 nm to pass through the optical elements therein.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are schematic views, useful in explaining a method of securing, the fourth lens to a housing;

FIGS. 5A and 5B are schematic views, useful in explaining a method of securing the reflecting mirror to the housing;

FIG. 6 is a schematic sectional view, showing an apparatus to be used for hardening a bonding agent, which is applied to the optical elements for securing it to the housing.

DETAILED DESCRIPTION OF THE PREFERRED EMBODIMENTS

This invention will be explained in detail with reference to the accompanying drawings showing an embodiment thereof.

Figure 1:
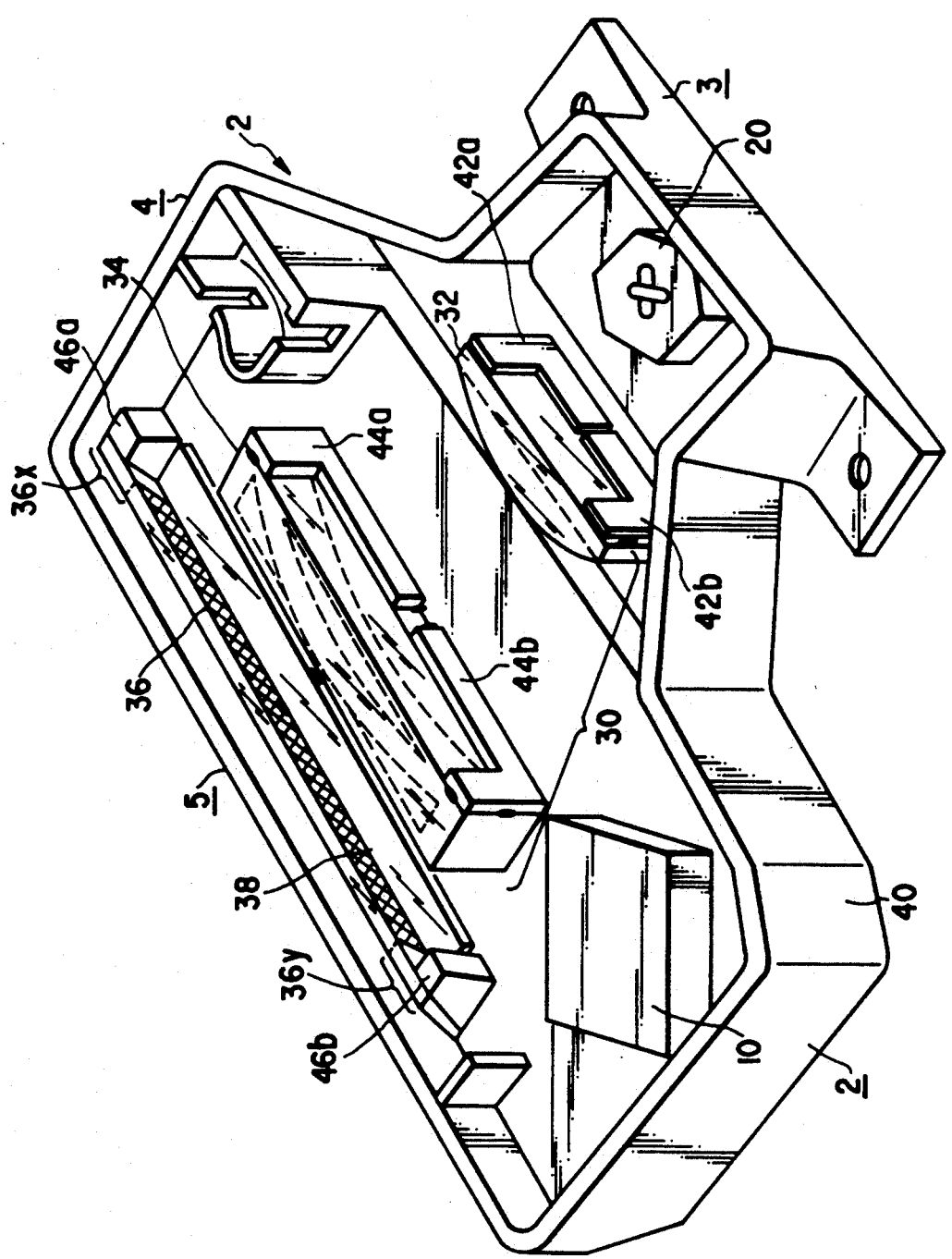
FIG. 1 is a schematic view, showing an optical unit according to the invention and having optical elements mounted therein.
Figure 2A:
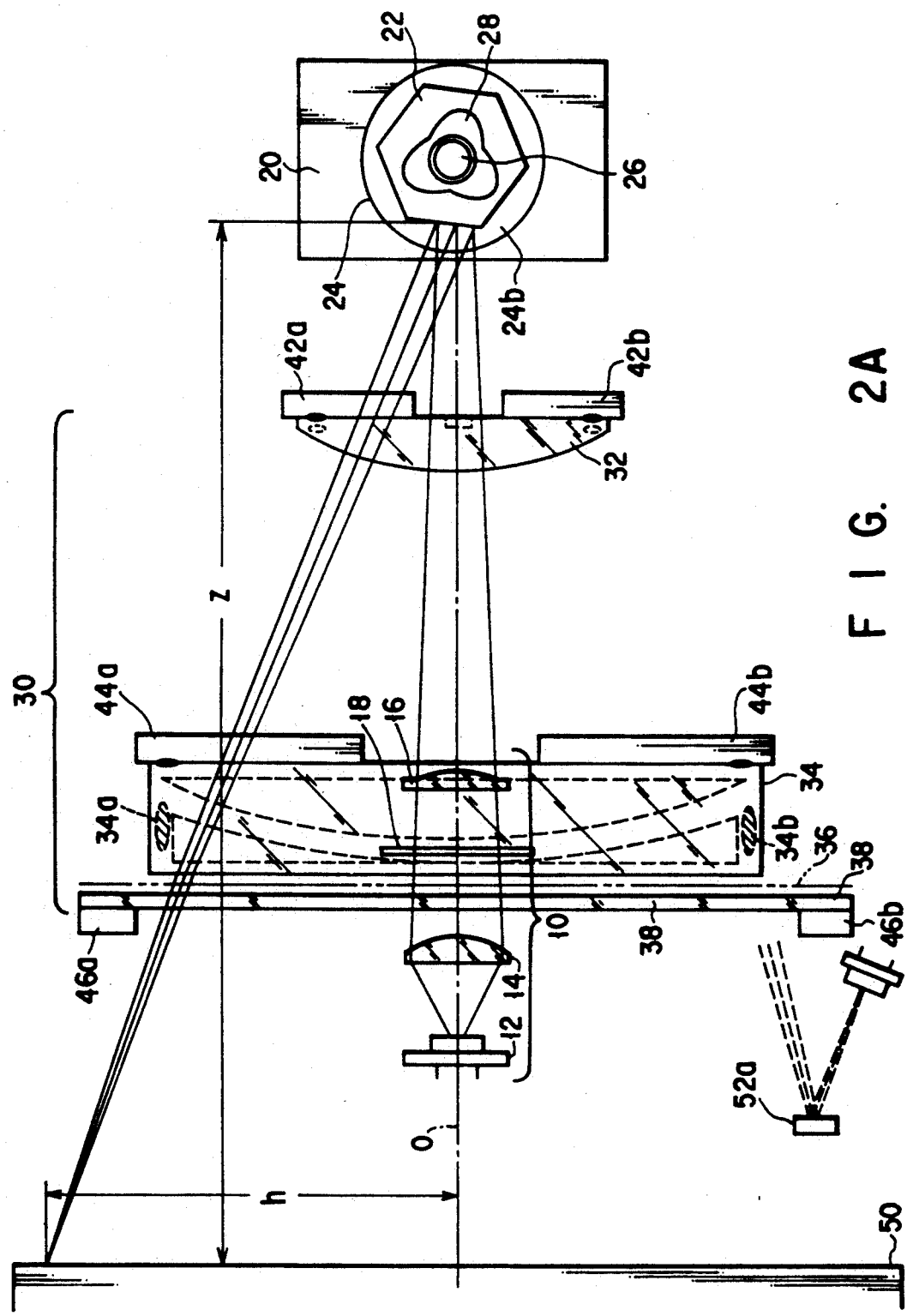
FIG. 2A is a schematic plan view, showing the overall structure of the optical unit and optical characteristics in a main scanning direction.
Figure 2B:
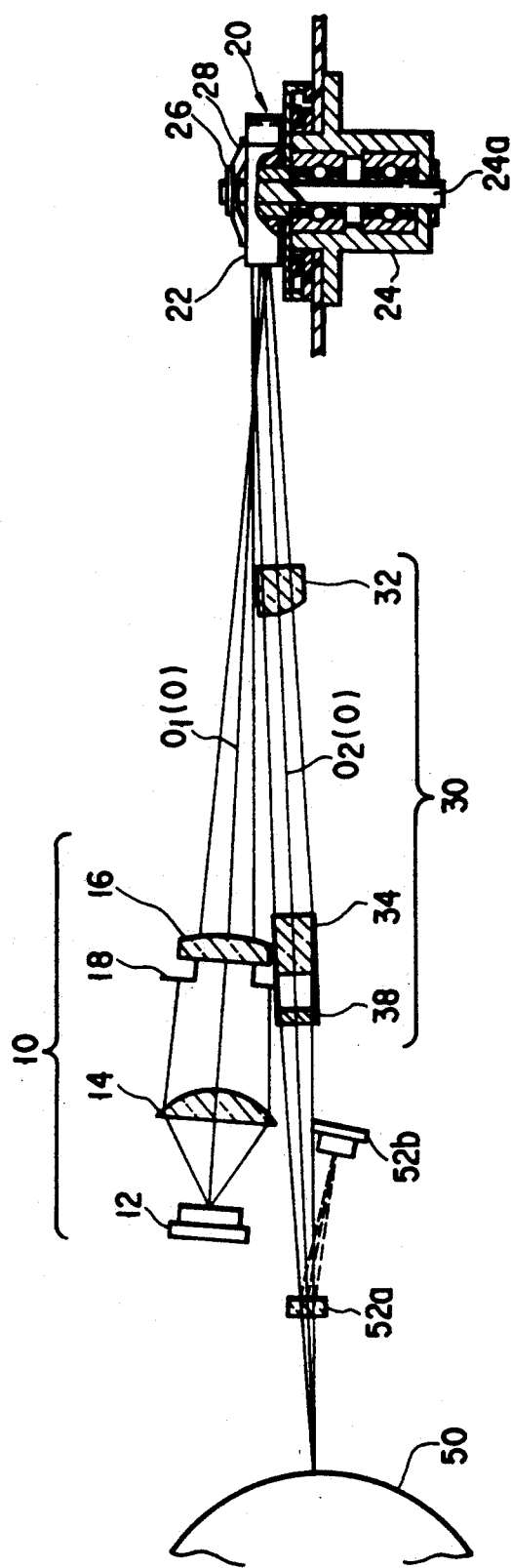
FIG. 2B is a sectional view, showing that state of the optical unit of FIG. 2A in which the deflection angle is 0 in a sub-scanning direction perpendicular to the main scanning direction.

FIGS. 1, 2A and 2B show a schematic arrangement of a raster scanning type optical unit 2 for use in a laser beam printer apparatus, etc. The optical unit 2 includes a light emitting unit 10 having a semiconductor laser element (i.e., a light source such as a laser diode) for emitting a laser beam, and lenses (i.e., a first optical system) for transforming the light beam to have a predetermined spot size, the laser element and lenses being formed integral in one body. The optical unit 2 contains an optical deflector 20 for deflecting the laser beam emitted from the unit 10, toward a photoconductor 50. The optical unit 2 further contains arranged between the unit 10 and the photoconductor 50, a focal system (i.e., second optical system) 30 having lenses for converging the deflected laser beam onto the recording surface of the photoconductor. The optical unit 2 further includes a housing 40 housing optical elements such as the unit 10, deflector 20, and focal system 30 in an airtight manner.

The light emitting unit 10 includes a laser diode 12 for emitting a laser beam, a collimating lens (i.e., primary lens) 14, which has positive powers acting in the first or main scanning direction (i.e., a horizontal direction as shown in FIG. 2A), and in the second or sub-scanning direction perpendicular to the former (i.e., a vertical direction as shown in FIG. 2B), and transforms the laser beam, supplied from the laser 12, into a converged light beam (or a parallel light beam). The unit 10 also includes a toric lens (i.e., secondary lens) 16, which has, like a convex lens, a positive power acting in the main scanning direction, and has, like a concave lens, a negative power acting in the sub-scanning direction. The primary and secondary lenses 14 and 16 are made of an optical glass such as BK7 or SK10.

An aperture stop 18 for maintaining the intensity of the laser beam at a substantially constant value is interposed between the lenses 14 and 16.

The laser 12, lenses 14 and 16, and aperture stop 18 are supported by a lens barrel (not shown) formed by using an aluminum die cast. This lens barrel has a flange held by a fixing member (not shown) provided at a predetermined location in the housing 40.

The optical deflector 20 is provided with a polygonal mirror 22 having six planar mirror surfaces, and an axial gap type motor 24 for rotating the mirror 22. The motor 24 has a shaft 24a rotatably supported by a direct bearing (having no reference numerals), and a rotor 24b formed integral with the shaft 24a into one body. The polygonal mirror 22 is mounted on an upper portion of the rotor 24b by means of a stop ring 26 and a leaf spring 28, and is rotated in a predetermined direction in accordance with rotation of the rotor 24.

A tertiary lens 32 and a fourth lens 34 are provided in the focal system 30 for correcting the distortion and field curve of the laser beam, continuously deflected by the polygonal mirror 22 in accordance with rotation thereof, before the laser beam is converged onto the photoconductor. The tertiary lens 32 and fourth lens 34 are made of e.g. PMMA resin. As shown in FIG. 2B, an optical path $O_1$, extending from the light emitting unit 10 including the first optical system, to the optical deflector 20, intersects at a predetermined angle in the sub-scanning direction an optical path $O_2$, extending from the optical deflector 20 to the photoconductor 50 through the tertiary and fourth lenses 32 and 34.

The tertiary and fourth lenses 32 and 34 serve as a kind of $f\theta$ lens which has a curvature provided in the main scanning direction at such a focal distance f as which makes an angle $\theta$, at which each mirror, surface of the polygonal mirror 22 is rotated, and is proportional to the distance h (see FIG. 2A) from the center of an optical path O through which the laser beam deflects the photoconductor conductor 50 in the main scanning direction. That is, the curvature is determined so as to satisfy the equation $h = f\theta$, and further to provide a smaller power in the sub-scanning direction as the deflection angle is increased in the main scanning direction.

Moreover, in the main scanning direction, the tertiary and fourth lenses 32 and 34 cooperate to reduce the field curve of the laser beam deflected by the polygonal mirror 22, and to proportion the distortion of the same to an appropriate level. In the sub-scanning direction, the lenses 32 and 34 cooperate to converge the light beam onto the photoconductor 50 by correcting that influence of inclination of each mirror surface of the polygonal mirror 22 which acts upon the light beam. A reflecting mirror 36 for reflecting the laser beam which has passed through the fourth lens 34 and a filter glass 38 closing the housing 40 and enabling the laser beam to reach the photoconductor 50 are interposed between the fourth lens 34 and photoconductor 50.

The housing 40 contains a holding element for holding the light emitting unit 10, a positioning marker positioning the optical deflector 20, and a plurality of guiding agents 42a and 42b (pair), 44a and 44b (pair) and 46a and 46b (pair) accurately guiding the tertiary lenses 32, fourth lens 34, reflecting mirror 36, and filter glass 38, respectively. The mirror 36 and filter glass 38 are secured to the guiding agents 46a and 46b.

The tertiary lens 32 is secured to the guiding agents 42a and 42b by means of a visible spectrum hardening type bonding agent hardened by visible spectrum rays. The fourth lens 34, mirror 36, and filter glass 38 are secured to the guiding agents 44a, 44b, 46a, and 46b. respectively, in a similar manner to the lens 32. It is preferable to use, for example, LUX TRAK LCR 603B (trade name) or LCR 604 (trade name) produced by ICI Japan Corporation as the visible spectrum hardening type bonding agent.

Those portions of the optical elements (tertiary and fourth lenses 32, 34, mirror 36, and filter glass 38) to which a bonding agent is applied are determined based on the necessary bonding strength.

Figure 3A:
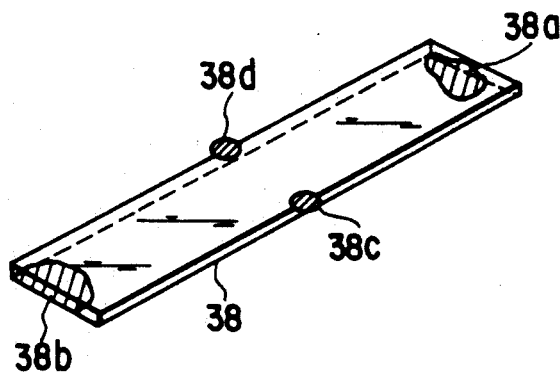
FIGS. 3A, 3B, and 3C are schematic views, showing those portions of a filter glass, a reflecting mirror, and a fourth lens to which a bonding agent is applied.

As is shown in FIG. 3A, in the filter glass 38, the visible spectrum hardening type bonding agent is applied to both opposite ends 38a and 38b and central edge portions 38c and 38d of the bottom surface, thereby bonding them on the housing 40, guiding agents 46a and 46b.

Figure 3B:
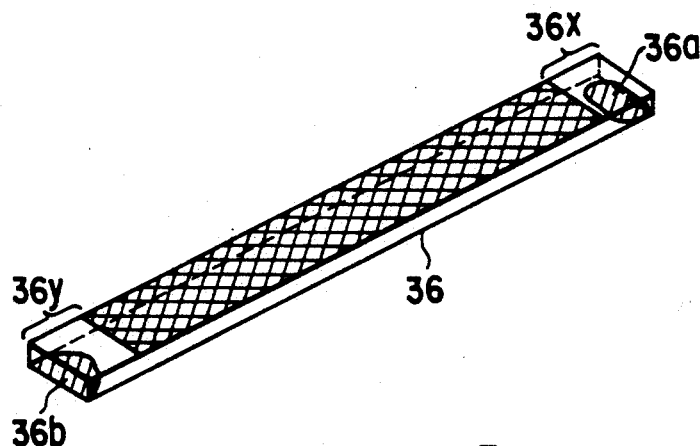

As is shown in FIG. 3B, the visible spectrum hardening type bonding agent is applied to both opposite ends 36a and 36b of the bottom surface of the reflecting mirror 36, and the mirror 36 is laminated on the filter glass 38 secured on the guiding agents 46a and 46b. The mirror 36 has non-reflecting areas 36x and 36y (i.e., reflecting material is not deposited in those areas) formed beforehand at locations corresponding to the ends 36a and 36b, through which visible spectrum is passed to harden the bonding agent.

Figure 3C:
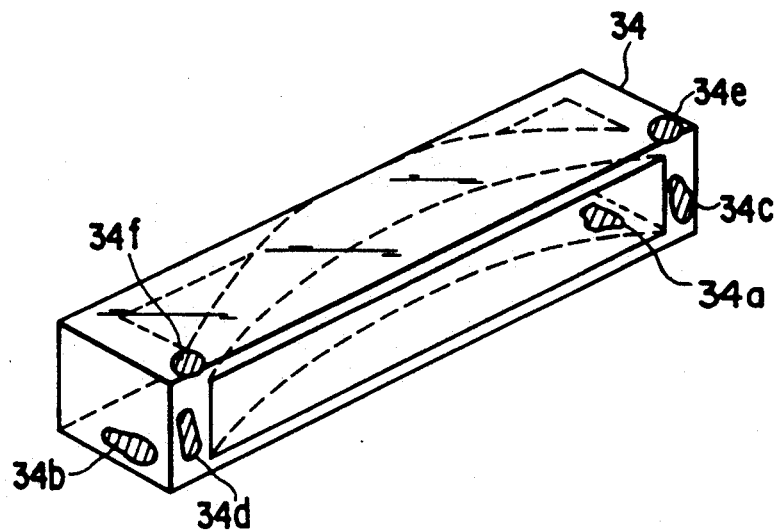

As is shown in FIG. 3C, in the fourth lens 34, the bonding agent is applied to both opposite ends 34a and 34b of the bottom surface, both opposite ends 34c and 34d of one side surface, and both opposite ends 34e and 34f of the upper surface, and then the lens 34 is adhered to the housing 40, and guiding agents 44a and 44b. As is depicted in more detail in FIG. 4, the fourth lens 34 has a draft formed at the bottom, which was used at the time of molding thereof, and hence has ribs 44c and 44d, formed beforehand at locations corresponding to the ends 34a and 34b, for arranging the lens 34 perpendicular to the optical axis $O_2$ (see FIG. 2B).

Moreover, in the tertiary lens 32, the bonding agent is applied to both opposite side ends of the bottom and both opposite ends of a side facing the guiding agents 42a and 42b (see FIG. 1), and those ends are adhered to the housing 40, and guiding agents 42a and 42b.

It is preferable to employ the apparatus for generating visible spectrum for hardening the visible spectrum hardening type bonding agent which can output, for example, light having a wavelength of approx. 470 nm (preferably, the light contains little thermo-rays). This apparatus can have such a simple structure having for example a held lamp and thermo-ray cutting filter.

In addition to the above mentioned optical elements, a monitoring mirror 52a and an HSYC detector 52b, which detect horizontal synchronization of a laser beam in the main scanning direction, are housed in the housing 40. The monitoring mirror 52a is arranged outside, in the main scanning direction, the optical path of a laser beam having passed the fourth lens 34 and forming an image to be printed out when the beam reaches the photoconductor 50. The HSYC detector 52b is arranged in a position in which it can reliably detect the laser beam reflected by the mirror 52a.

Now, the operation of the unit as constructed above will be explained.

A laser beam reflected by the semiconductor laser 12 is transformed by the primary lens 14 into a converged beam or a parallel beam, then formed by the aperture stop 18 to have a predetermined spot size, and then guided to the secondary lens 16. Thereafter, the laser beam is transformed into a substantial parallel beam in the main scanning direction, and into a converged beam in the sub-scanning direction, being guided to the polygonal mirror 22 of the optical deflector 20.

Subsequently, the laser beam is continuously reflected by the polygonal mirror 22 toward the second optical system (focal system) 30 at an angle corresponding to the rotational angle $\theta$ of the mirror 22 in accordance with rotation thereof.

The laser beam then passes the tertiary and fourth lenses 32 and 34 of the second optical system 30. By virtue of the lenses 32 and 34, the laser beam is corrected in the main scanning direction such that the field curve of the beam is reduced and the distortion of the same is proportioned to a desired level. Further, it is corrected in the sub-scanning direction to form a substantially linear line on the photoconductor 50 irrespective of the inclination of the polygonal mirror 22.

Part of the laser beam is guided to the monitoring mirror 52a, where it is reflected toward the HYSC detector 52b. Based on the part of the laser beam detected by the detector 52b, the timing of output of the laser beam is determined, and the interval between laser beams output subsequently by the laser 12 is controlled to a predetermined value.

The photoconductor 50 is rotated in a predetermined direction in accordance with rotation of a main motor (not shown), thereby having all of the outer periphery thereof exposed to the laser beam.

The laser beam converged on the photoconductor 50 is visualized by visualizing means (not shown), and then copied on a copying medium.

Next, results of bonding strength tests made to the bonding methods of both the invention and the conventional unit will be described in detail.

Objects to be tested were the tertiary and fourth lenses 32 and 34, reflecting mirror 36, and filter glass 38 (second optical system 30) housed in the housing 40. There were prepared four samples for each object which were obtained by securing the object to the housing by means of a visible spectrum hardening type bonding agent, ultraviolet (UV) hardening type bonding agents A, B, and C, respectively.

A drop test 1, a heat shock test, and a drop test 2 were performed in the order mentioned, in which it was determined whether or not exfoliation or fallout occurred for each sample. The bonding portions of each optical element of a corresponding sample, the amount of the bonding agent, the bonding agent hardening time period were as follows:

Filter glass 38

Four bonding portions: both opposite ends 38a and 38b of the bottom; both opposite central edge portions 38c and 38d.

These portions were bonded to the housing 40, guiding agents 46a and 46b (See FIG. 3A).

Reflecting mirror 36

Two bonding portions: both opposite ends 36a and 36b of the bottom

These two portions were bonded to the guiding agents 46a and 46b (as is described above, the guiding agents 46a and 46b are commonly used for the filter glass 38 and reflecting mirror 36; see FIG. 3B).

Fourth lens 34

Six bonding portions: both opposite ends 34a and 34b of the bottom surface, both opposite ends 34c and 34d of one side surface, and both opposite ends 34e and 34f of the upper surface These six portions were bonded to the housing 40, and guiding agents 44a and 44b (see FIG. 3C). The fourth 34 is not permeable to ultraviolet, the four portions 34a, 34b, 34c, and 34d shown in FIG. 3C were not bonded to the housing by using the UV hardening type bonding agents A, B, and C.

Tertiary lens 32

Four bonding portions (not shown): both opposite side ends of the bottom and both opposite ends of a side These four portions were bonded to the housing 40 and guiding agents 42a and 42b.

Amount of each bonding agent approx 0.005–0.02 g per one portion

Bonding agent hardening time 60 sec per sample conveyer

A hardening light emitting apparatus as shown in FIG. 6 was used to harden the bonding agents This apparatus has a belt 62 having at least two rollers, sample conveyers 60 on which the housing 40 is to be placed, and a lamp house 64 arranged in a region in which the belt moves. In the apparatus, visible spectrum or ultraviolet was radiated onto the housing 40 for a predetermined period of time.

The drop test (test 1 and test 2) and heat shock test were performed under the following conditions:

[Drop tests 1 and 2]

Each sample was dropped six times onto a wood table from 10 cm height.

First time: the housing 40 was dropped in a state where the upper portion thereof faced downward;

Second - fifth times: the housing 40 was dropped in a state where the sides 2–5 (see FIG. 1) thereof faced downward, respectively; and Sixth time the housing 40 was dropped in a state where the lower portion thereof faced downward.

The weight of each sample was 1000 g.

[Heat shock test]

Each sample was left for two hours in atmospheres at temperatures of −20° C. and 60° C., respectively. This cycle was repeated three times, i.e., each sample was left under the conditions for 12 hours. There were no limitations to humidity.

The results obtained from the above tests are shown in the following Table 1.

TABLE 1

| KINDS OF BONDING AGENTS | | BONDED ELEMENTS | DROP TEST 1 | HEAT SHOCK | DROP TEST 2 AFTER HEAT SHOCK | JUDGEMENT |
|---|---|---|---|---|---|---|
| SPECTRUM HARDENING TYPE RESIN BONDING AGENT | | FOURTH LENS | o | o | o | o |
| | | REFLECTING MIRROR | o | o | o | |
| | | COVER GLASS | o | o | o | |
| UV HARDENING TYPE RESIN BONDING AGENT | A | FOURTH LENS | — | o | x | x |
| | | REFLECTING MIRROR | — | x | — | |
| | | COVER GLASS | — | o | o | |
| UV HARDENING TYPE RESIN BONDING AGENT | B | FOURTH LENS | — | o | x | x |
| | | REFLECTING LENS | — | x | — | |
| | | COVER GLASS | — | o | o | |
| | C | FOURTH LENS | x | — | — | x |
| | | REFLECTING MIRROR | x | — | — | |
| | | COVER GLASS | o | — | — | | o: NO ABNORMALITY OCCURED AFTER TESTS
x: PEELING OCCURRED AFTER TESTS
—: NO TESTS WERE CONDUCTED

As is clearly understood from the Table 1, the bonding strength of the visible spectrum type bonding agent is higher than that of the UV type bonding agents A, B, and C, and hence it is harder to peel off the optical elements bonded to the housing 40 with the former agent.

Table 2 shows the results of other tests performed to see how to more reliably secure the optical elements to the housing. In these tests, the optical elements were bonded to the housing by means of the visible spectrum hardening type bonding agent under various conditions. The amount of the bonding agent was determined based on the thickness thereof, and the bonding strength was determined based on the hardness of the bonding agent assumed when it was hardened. Samples were subjected to harder tests than in the case shown in Table 1. That is, three drop tests were carried out for each sample, and temperature/humidity tests were added.

The conditions of the temperature/humidity tests were as follows:

Each sample was left for 24 hours in an atmosphere at a high temperature of 60° C. and a high humidity of 85%.

The thickness of the bonding agent, was proportioned by using fixing devices shown in FIGS. 4A, 4B and 5A, 5B . Specifically, the device shown in FIGS. 4A and 4B was used for fixing the fourth lens 34, while the device shown in FIGS. 5A and 5B was used for fixing the reflecting mirror 36.

In FIGS. 4A and 4B pressing elements or pressers 54a to 54d provide the guiding agents 44a and 44b and ribs 44c and 44d of the housing 40 with optimal urging forces acting the directions indicated by arrows A and B. More particularly, the pressers 54a and 54b urge the lens 34 toward the ribs 44c and 44d, and the pressers 54c and 54d urge the lens 34 toward the guiding agents 44a and 44b. These urging forces were applied by a microhead mechanism (not shown) so as to set the thickness of the bonding agent to e.g., 5, 10, 60, 100, and 500 μm. Further, in FIGS. 5A and 5B, pressing elements or pressers 56a and 56b provide the guiding agents 46a and 46b of the housing 40 with an optimal urging force acting in the direction indicated by arrow a. This urging force was controlled in a manner similar to the above.

The hardness of the bonding agent, when hardened, was determined with reference to the A-scale based on the Shore hardness test. Specifically, bonding agents having hardnesses of A60, A80, and A100 were used.

Figure 7:
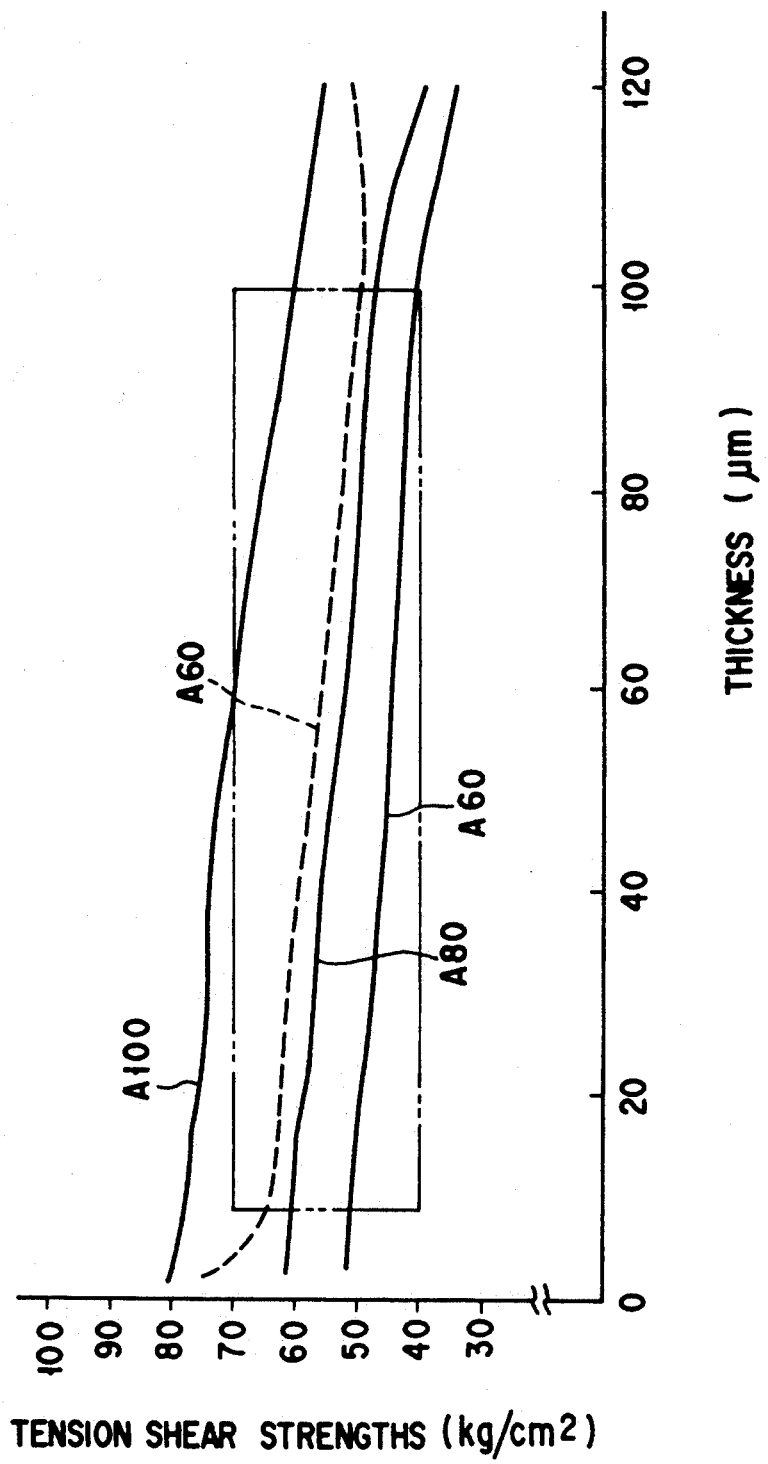
FIG. 7 is a graph, showing the relationship between the tension shear strength of a visible spectrum hardening type bonding agent and the thickness thereof.

As is evident from FIG. 7 and table 2, good results were obtained when the bonding agent has a thickness of 10–100 μm and a Shore hardness of A60, A80 and A100. Further, assuming that the allowance is approx. 200% in consideration of the results of the temperature/humidity test (ambient condition test), a maximum bonding strength can be obtained by setting the Shore hardness to A80 or less, and the thickness to 10–100 μm.

In the invention, a visible spectrum hardening type bonding agent, which has a Shore hardness of A80 or less when hardened, is used for securing optical elements including a focal system, to a housing. Thus, the bonding agent is used in place of conventional fixing elements such as leaf springs or screws used for securing the optical elements to the housing, which reduces the cost of component parts and the cost of assembling.

Moreover, the use of the visible spectrum hardening type bonding agent not only prevents generation of ozone and heat which occurs when an ultraviolet hardening type bonding agent is used instead, but also restrains generation of heat a deformation of the housing due to the heat which takes place when a thermohardening type bonding agent is used. The visible spectrum hardening type bonding agent also allows the use of a resin lens made by PMMA, etc.

Furthermore, the visible spectrum hardening type bonding agent can be hardened in a short time, resulting in a reduction in manufacturing time.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical unit comprising:
   means for deflecting a light beam;
   means, having a plurality of optical elements, for focusing the deflected light beam onto an object;
   means for housing the deflecting means and focusing means; and
   a plurality of means for bonding each of the optical elements to the housing means, the plurality of bonding means being hardened when they receive a visible spectrum being passed through the optical

TABLE 2

| CONDITIONS FOR BONDING AGENT | | DROP TEST 1 | HEAT SHOCK TEST DROP 2 | DROP TEST 2 | TEMPERATURE/ HUMIDITY TEST | DROP TEST 3 | JUDGEMENT |
|---|---|---|---|---|---|---|---|
| HARDNESS (A-SCAIE) OF SHORE TEST) | 60 | o | o | o | o | o | o |
| | 80 | o | o | o | o | o | o |
| | 100 | x | — | — | — | — | x |
| THICKNESS (μm) | 5 | x | — | — | — | — | x |
| | 10 | o | o | o | o | o | o |
| | 80 | o | o | o | o | o | o |
| | 100 | o | o | o | o | o | o |
| | 500 | o | o | x | — | — | x | o: NO ABNORMALITY OCCURRED AFTER TESTS
x: PEELING OCCURRED AFTER TESTS
—: NO TESTS WERE CONDUCTED

FIG. 7 shows tension shear strengths (Kg/cm$^2$), obtained when the hardness of the bonding agent determined with reference to the A-scale based on the Shore hardness test and the varying thickness thereof.

elements.

2. The optical unit according to claim 1, wherein the focusing means includes: a lens for causing the amount of rotation of a mirror surface of the deflecting means, to be proportional to a distance between a reference point of the rotation and that point of the object where the deflected light beam is to reach; a reflecting mirror for reflecting the light beam to a predetermined direction; and a glass plate closing the housing in an airtight manner.

3. The optical unit according to claim 2, wherein the reflecting mirror includes a reflecting area for reflecting the light beam to a predetermined direction and non-reflecting areas for passing the visible spectrum to the bonding means therethrough.

4. The optical unit according to claim 1, wherein the plurality of bonding means are dropped at a plurality of predetermined bonding portions of the housing means.

5. The optical unit according to claim 1, wherein the plurality of bonding means are hardened by means of the visible spectrum having a wavelength of 400 nm–700 nm.

6. The optical, unit according to claim 5, wherein the plurality of bonding means are hardened by means of the visible spectrum having a wavelength of 450 nm–500 nm.

7. The optical unit according to claim 1, wherein each of the plurality of bonding means has a thickness determined by an urging force applied at the time of manufacture or hardening of the bonding means.

8. The optical unit according to claim 7, wherein the urging force is applied so as to proportion the thickness of the plurality of bonding means to a value falling within a range of 10–100 μm.

9. The optical unit according to claim 1, wherein preferably, the plurality of bonding means are proportioned, when hardened, to have a hardness falling within a range of 60–100 on the A-scale based on the Shore hardness test.

10. The optical unit according to claim 9, wherein preferably, the plurality of bonding means are proportioned, when hardened, to have a hardness falling within a range of 80 or less on the A-scale based on the Shore hardness test.

11. The optical unit according to claim 1, wherein the housing means includes predetermined positioning markers positioning the optical elements.

12. The optical unit according to claim 11, wherein the positioning markers support the optical elements such that the optical elements stand perpendicular to the path of the light beam.

13. The optical unit according to claim 11, wherein the positioning markers include ribs used depending upon the outlines of the optical elements.

14. The optical unit according to claim 11, wherein the plurality of bonding means are provided to each of the positioning markers.

15. An optical unit comprising:
means for focusing a light beam which includes a focusing lens having predetermined refracting powers and a reflecting mirror, the focusing lens converges the light beam onto an object in a predetermined position, and the reflecting mirror reflects the light beam having passed the focusing lens;
means, made of a thermohardening type or thermoplastic resin, for housing the focusing means; and
means for bonding dropped between the housing means and each of the focusing lens and the reflecting mirror, having a thickness of 10–100 μm, the bonding means being hardened, when it receives a visible spectrum having a wavelength of 450–500 nm, such that it has a hardness of 80 or less on the A-scale based on the Shore hardness test.

16. The optical unit according to claim 15, wherein the reflecting mirror includes a reflecting area for reflecting the light beam to a predetermined direction and non-reflecting areas for passing the visible spectrum to the bonding means therethrough.

17. A method of bonding a housing of an optical unit and optical elements contained in the housing, comprising the steps of:
forming positioning portions to accord with the shapes of the optical elements, the positioning portions positioning the optical elements such that they stand perpendicular to a path of a light beam emitted from a light source;
applying a bonding means between the positioning portions and the optical elements, the bonding means being hardened when visible spectrum are radiated thereon, thereby obtaining a hardness falling within a range of 80 or less on the A-scale based on the Shore hardness test;
applying an urging force to the optical elements positioned by the positioning portions, so as to control the bonding means to have a thickness of 10–100 μm; and
radiating visible spectrum having a wavelength of 450–500 nm to pass through the optical elements therein.

18. The method according to claim 17, wherein the optical elements include a lens for focusing the light beam, a reflecting mirror having a reflecting area for reflecting the light beam to a predetermined direction and non-reflecting areas for passing the visible spectrum to the bonding means, and a glass plate closing the housing of the optical unit in an airtight manner, and the bonding means being hardened when it receives visible spectrum having passed through each of the lens, the non-reflecting areas of the reflecting means and the glass plate therein.

* * * * *